United States Patent [19]

Marcusen

[11] Patent Number: 5,331,499
[45] Date of Patent: Jul. 19, 1994

[54] INSTALLABLE WRITE-PROTECT BUTTON FOR FLOPPY DISK

[76] Inventor: Carroll L. Marcusen, 711 E. Gorham St., Madison, Wis. 53703

[21] Appl. No.: 937,076

[22] Filed: Aug. 27, 1992

[51] Int. Cl.⁵ .................... G11B 23/03; G11B 15/04
[52] U.S. Cl. ........................... 360/133; 360/60
[58] Field of Search ............... 360/60, 133, 132; 369/291

[56] References Cited

U.S. PATENT DOCUMENTS

| Re. 33,961 | 6/1992 | Swinburne et al. | |
|---|---|---|---|
| 4,496,999 | 1/1985 | Espin . | |
| 4,618,060 | 10/1986 | Tarter . | |
| 4,649,452 | 3/1987 | Brugman . | |
| 4,658,317 | 4/1987 | Lievsay, Jr. . | |
| 4,685,017 | 8/1987 | Swinburne et al. | 360/60 |
| 4,757,407 | 7/1988 | Simokat . | |
| 4,771,354 | 9/1988 | Zschau . | |
| 4,796,138 | 1/1989 | Ono | 360/60 |
| 4,811,150 | 3/1989 | Sciggs et al. . | |
| 4,969,060 | 11/1990 | O'Neill . | |
| 5,150,269 | 9/1992 | Iwaki et al. | 360/60 |

Primary Examiner—A. J. Heinz
Assistant Examiner—Allen Cao
Attorney, Agent, or Firm—Ross & Stevens

[57] ABSTRACT

A write-protect button is designed to be retrofitted into an intact floppy disk which has been constructed with a write-protect assembly but without the write-protect button. The present invention also includes a method of retrofitting the write-protect button into an intact floppy disk without dismantling the disk.

2 Claims, 3 Drawing Sheets

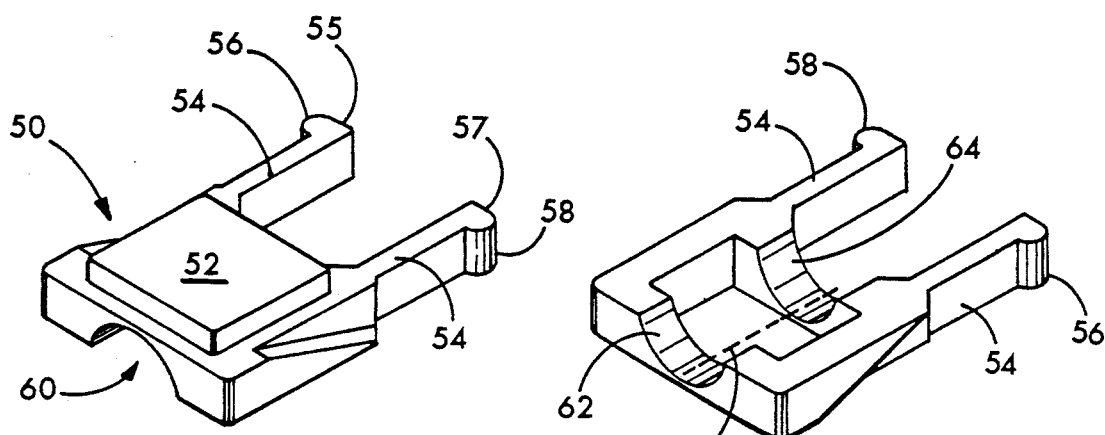
FIG. 9
FIG. 10
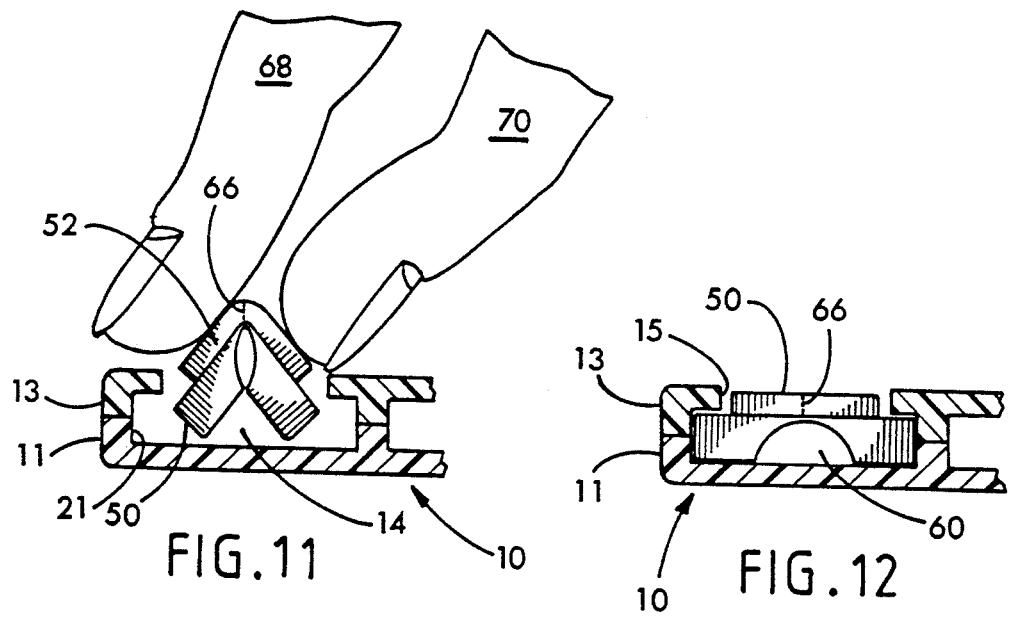
FIG. 11
FIG. 12

INSTALLABLE WRITE-PROTECT BUTTON FOR FLOPPY DISK

FIELD OF THE INVENTION

The present invention is directed to the field of computer floppy disks. The present invention is specifically directed to a write-protect button on the floppy disk, and particularly to a write-protect button which may be retrofitted into an intact floppy disk which does not have such a button.

BACKGROUND OF THE INVENTION

Computers use a variety of systems to "write" or store programs and data. Examples of systems include electromagnetism and lazer-written processes such as flop-optics. The write/read head in the computer drive converts electric code signals from the computer into magnetic codes recorded on the surface of the disk. The disk drive then reverses this process to "read" the disk. A general discussion of this process may be found in Macaulay, D., 1988, *The Way Things Work*, Houghton-Mifflin Company, Boston, pp. 302-303 and 340.

A floppy disk is a flexible magnetic disk used in a disk drive of a computer to store or retrieve programs and data. The disk is inserted into the disk drive of the computer by hand. The disk is protected by a jacket in which a window is cut to expose the surface of the disk. Inside the disk drive, the head travels along the window as the disk rotates inside the jacket. The jacket also prevents the disk from damage during the handling process.

There are two common types of floppy disks in the computer industry: a 3½ inch size disk and a 5¼ inch disk. The present invention is specifically directed to the 3½ inch size disk, illustrated in FIGS. 1-3 and described later in this disclosure, primarily because it incorporates a write-protect system comprising a small window extending through the disk jacket. The write-protect system is intended to prevent inadvertent erasure of the information recorded on the disk. By obstructing the window with a write-protect button, also described later in this disclosure, the disk operates in the "write/read" format. When the window is not blocked, the disk only serves in the "read only" format.

The 5¼ inch disk has a similar write/read capability; however, the write/read assembly in the 5¼ inch disk usually includes a notch formed on the edge of the disk. In order to change the "read only" format of the 5¼ inch disk into a "write/read" format, the notch must be filled in. Disclosures such as U.S. Pat. No. 4,649,452 to Brugman, U.S. Pat. No. 4,658,317 to Lievsay, Jr., U.S. Pat. No. 4,771,354 to Zschau, U.S. Pat. No. 4,757,407 to Simokat, U.S. Pat. No. 4,969,060 to O'Neill, and U.S. Pat. No. 4,618,060 to Tarter all illustrate various forms of write-protect clips designed to be retrofitted onto a 5-inch floppy disk to turn the disk into a "read only" disk.

Reference is made to U.S. Pat. No. 4,409,630 to Saito, which discloses a write-protect tab assembly including a write-protect button slidably mounted in a pocket formed in the jacket of a computer disk. U.S. Pat. No. Re. 33,961 to Swinburne et al. is also directed to a write-protect tab assembly for a floppy disk jacket. Unlike Saito, the Swinburne et al. tab is designed to snap onto or be "encaptured" by a jacket base before the cover of the jacket enclosing the floppy disk is attached to the base. Apparently, the cover must sometimes be removed from the base after the jacket has been assembled and sealed. In the Saito disclosure, the write-protect button is not "encaptured" in the floppy disk jacket. When the jacket assembly is subsequently disassembled, the button falls out during the handling process. Swinburne et al. resolve this problem by slidably attaching the button to the base so that it will not fall out. However, the tab is not designed to be retrofitted into an assembled floppy disk jacket.

Computer floppy disks are commonly prepared with a write-protect assembly, as disclosed in the '630 patent to Saito and the '961 patent to Swinburne et al. The assembly gives the computer disk owner the option of using the disk in the "write/read" mode, in which the computer operator can read, enter and delete information from the disk or the "read only" mode, in which the operator can read information from the disk but not insert or delete information. This capability is accomplished by a slidable button, which will be described further on in this disclosure.

Many of the disks currently being produced for consumer use, especially the pre-programmed disks, i.e., disks containing previously entered software for use by a computer operator in the operator's computer, do not contain the slidable write-protect button in the floppy disk jacket. Thus, the "read only" window cannot be blocked which leaves the disk in the "read only" format. Unless the window can be obscured somehow, the disk is suitable only for reading the information previously placed on the floppy disk. This makes the floppy disk unfit for further use after the information has been transferred onto a computer disk hard drive. Presently, there is no means to retrofit a floppy disk with a write-protect button.

SUMMARY OF THE INVENTION

The present invention is designed to override the "read only" system that many of the new pre-programmed disks now have due to the absent write-protect button. This object is accomplished by an installable write-protect button, designed to be retrofitted into the empty write-protect pocket currently present on an assembled floppy disk.

The write-protect button is designed for retrofit installation in a write-protect pocket on the jacket of a computer floppy disk. The pocket includes a write/read pocket with a "read only" portion and a "write/read" portion in the jacket of the disk. The pocket includes a channel within the jacket for slidably receiving the write-protect button.

The write-protect button comprises a blocking tab of sufficient size to encompass the "read only" opening. The blocking tab has a first upper end, a second lower end and two sides. The write-protect button also includes a pair of relatively rigid substantially parallel spaced apart opposed arms having first ends and second ends, wherein the first ends are attached to the blocking tab. The arms comprise means to slidably engage the write-protect button in the channel.

The button also includes means to slidably retrofit the write-protect button in the write/read-pocket of the disk without dismantling the disk. The means generally comprises a memory/flex material in the opposed arms allowing the second ends of the arms to draw together under inward pressure so as to squeeze into the channel. The memory flex material then allows the button to return to its original position when the pressure is removed, thereby lockfitting the write-protect button in the write/read pocket.

The present invention is also directed to a method of installing a write-protect button in a write/read pocket on the jacket of an intact computer floppy disk. The method comprises positioning the write-protect button, described above, near the write/read pocket. The arms of the button are flexed inwardly under inward pressure such that the second ends of the arms are drawn together. The second ends of the arm are then inserted into the channel of the write/read pocket, and the first ends of the arms are urged into the opening of the write/read pocket, wherein the write-protect button slidably fits into the write/read pocket and is retained therein.

The present invention is also directed to a write-protect button similar to that described above, wherein the blocking tab comprises a memory flex material allowing the blocking tab to bend in axial alignment with the sides of the blocking tab under inward pressure of the sides of the blocking tab and return to its original position when the pressure is removed. The write-protect button further comprises a pair of relatively rigid substantially parallel spaced apart opposed arms having first ends and second ends, wherein the first ends are attached to the blocking tab. The arms comprise means to slidably engage the write-protect button in the channel. The write-protect button further includes means to slidably retrofit the write-protect button in the write/read pocket of the disk without dismantling the jacket of the disk. The method further includes flexing the blocking tab inwardly under inward pressure such that the second ends of the arms are drawn together to bend the blocking tab in axial alignment with the sides of the blocking tab by inward pressure. The second ends of the arms are then inserted into the channel of the write/read pocket and the first ends of the arms are urged into the opening of the write/read pocket, wherein the write-protect button slidably fits into the write/read pocket and is retained therein.

The present invention advantageously gives "new life" to a computer floppy disk designed to be used in the "read only" mode by allowing a write-protect button to be retrofitted into the write/read channel of an intact computer floppy disk.

Further objects, features and advantages of the invention will be apparent from the following detailed description when taken in conjunction with the accompanying drawings.

BRIEF DESCRIPTION OF THE DRAWINGS

In the drawings:

FIG. 9 is a top perspective view of an alternative embodiment of the write-protect button of the present invention.

FIG. 10 is a bottom perspective view of the write-protect button of FIG. 9.

FIG. 11 is a side, partial cross-sectional view illustrating the insertion of the write-protect button of FIG. 9 into a computer floppy disk.

FIG. 12 is a side, partial cross-sectional view of the floppy disk of FIG. 11 illustrating the final placement of the write-protect button therein.

DETAILED DESCRIPTION OF THE INVENTION

Figure 1:
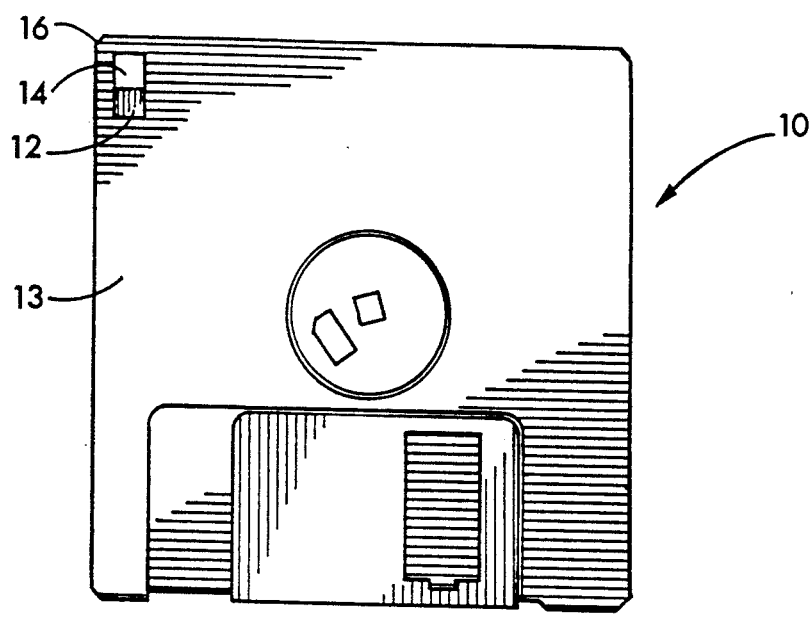
FIG. 1 is a bottom plan view of a prior art computer floppy disk.
Figure 2:
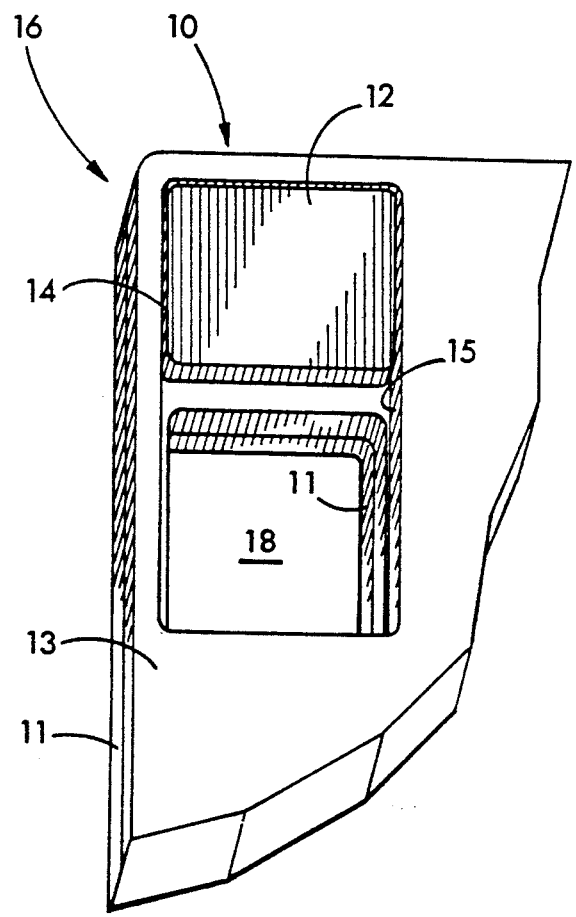
FIG. 2 is a partial perspective view of the write/read pocket, located in the upper left hand portion of the computer floppy disk of FIG. 1, illustrating an exposed window.
Figure 3:
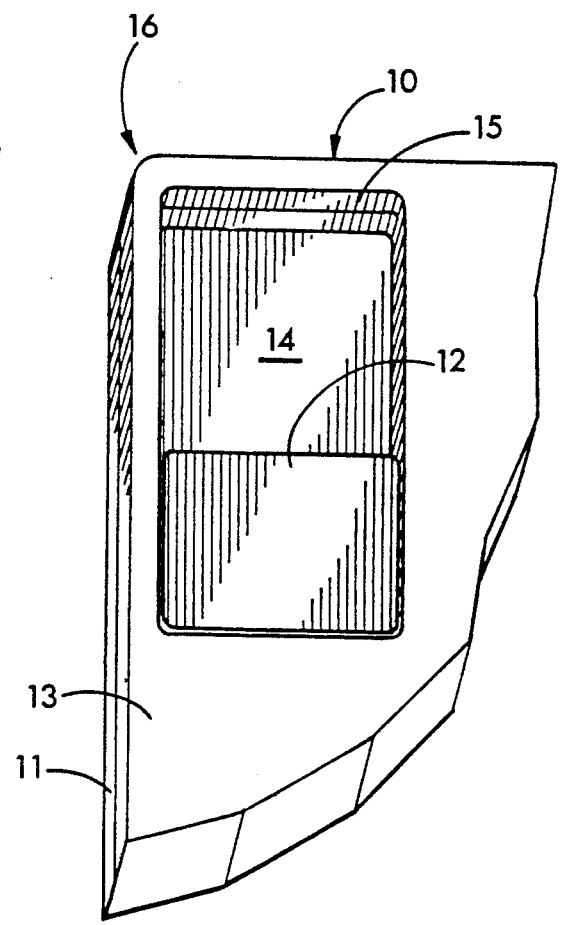
FIG. 3 is a partial perspective view of the write/read pocket of FIG. 2 illustrating an obstructed window.

Referring now to the attached drawings, FIGS. 1-3 are directed to a typical prior art 3½ inch computer floppy disk known to the art, designated by reference number 10. The disk includes an upper jacket 11 and a lower jacket 13. Floppy disks 10 are commonly equipped with a factory-installed slidable write/read-protect button or switch 12 (hereinafter referred to as a "write-protect button" 12). The write-protect button 12 allows the user to choose whether the floppy disk 10 is to be used solely for reading pre-programmed information contained on the floppy disk, i.e., "read only," or reading and additionally entering (writing) information on the disk, i e., "write/read" mode .

In the prior art floppy disks, the write-protect button 12 is slidably positioned in a write/read pocket 14 typically in one corner 16 of the floppy disk 10. The pocket 12 is formed from a cut-out section in the lower jacket 13 defined by a surrounding wall 15. The pocket 14 is generally as wide as the button 12 and twice the length.

Reference is made to FIGS. 2 and 3 for a detailed view of the prior art placement of the button 12 in the pocket 14. FIG. 2 illustrates the button 12 in the "read only" position. FIG. 3 illustrates the button 12 in the "write/read" position. In FIG. 2, the read only position, the button 12 is positioned in the pocket 14 in a manner to expose an opening or window 18 through the upper and lower jackets 11, 13 of the disk 10. The window 18 allows a beam of light (not shown) to pass through the disk 10, which "instructs" the computer not to allow any information to be entered to or deleted from the disk 10. In FIG. 3, the write/read position, the button 12 slides along the pocket 14 to obscure the window 18, thereby blocking the light passage and instructing the computer to allow information to be entered to or deleted from the disk 10. The button 12 can be slid in either position by thumb manipulation.

As discussed previously, many disks currently being produced, especially pre-programmed disks, omit the slidable write-protect button 12. Therefore, unless the window 18 can be obscured, the disk 10 is suitable only for reading the information previously placed on the disk 10.

The present invention is designed to provide an installable write-protect button to be retrofitted into a pocket currently present on the floppy disk, which does not contain a factory-installed write-protect button. The installable write-protect button installs into the empty pocket on a floppy disk.

Reference is now made to FIGS. 4-7, which illustrate an installable write-protect button 20 of the present invention. The button 20 is preferably made of a resilient plastic, but can be made of metal or other materials known to the art. The button 20 can be extruded as a one-piece unit or it can be made from separate components and attached together by glue, soldering or other methods known to the art. The button 20 includes a blocking tab 22. The blocking tab 22 has a first upper end 22a, a second lower end 22b and two sides 22c. The blocking tab 22 is designed to be of a sufficient size to encompass or obscure the window 18, illustrated in FIG. 2, thereby blocking the light passage and instructing the computer to allow information to be entered to or deleted from the disk 10. The blocking tab 22 attached to flexible legs 24, which are designed to flex inwardly to allow the installation of the button 20 in an assembled computer disk. The legs 24 can be compressed, by finger manipulation, tweezer manipulation or other inward force, to allow installation of the legs 24 into the pocket 14 of the disk. Once pressure is released, the legs 24 are expanded to hold the button 20 in place in the pocket 14.

Figure 4:
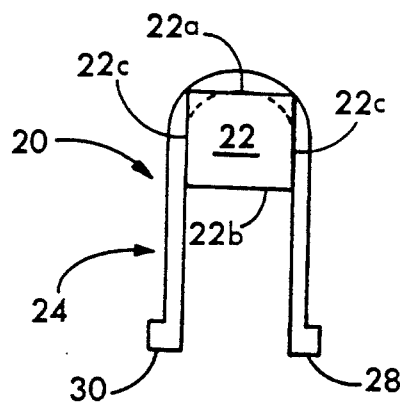
FIG. 4 is a top plan view of an installable write-protect button of the present invention.
Figure 5:
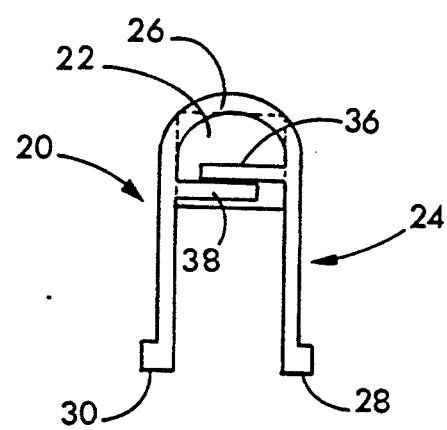
FIG. 5 is a bottom plan view of the write-protect button of FIG. 4.
Figure 6:
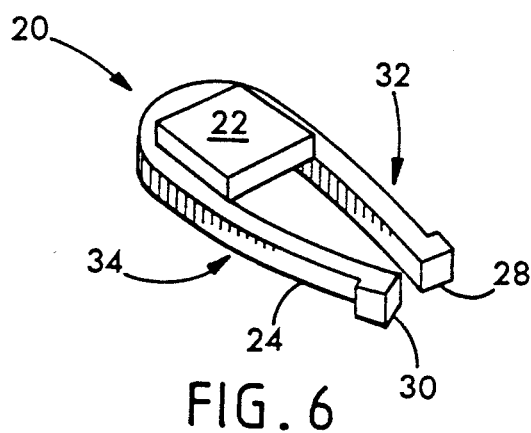
FIG. 6 is a perspective view of the write-protect button of FIG. 4.
Figure 7:
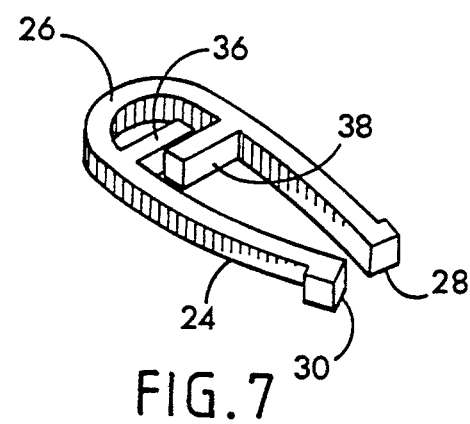
FIG. 7 is a perspective view of the write-protect button of FIG. 6 absent the button facing.

The flexible legs 24 are attached to each other at a juncture 26, illustrated in FIGS. 5 and 7. The opposite ends of the legs are defined by two outwardly extending posts 28, 30. The legs 24 are positioned such that they are substantially parallel to each other when relaxed as shown in FIGS. 4 and 5. However, by simple inward force along the arrows 32–34, as illustrated in FIG. 6, such as by manipulation with the thumb and forefinger, the legs 24 can be bent inwardly.

Located approximately half way between the juncture 26 and the outward posts 28, 30 are corresponding support posts 36, 38 attached to each of the legs 24. These support posts 36, 38 are off-center with respect to each other, such that the ends of the posts 36, 38 do not meet. However, the posts 36, 38 are in alignment with each other such that they slide upon each other as the legs 24 are bent inwardly or allowed to flex outwardly. Thus, the support posts provide a flexible support between the legs 24 without restricting the inward movement of the legs.

Figure 8:
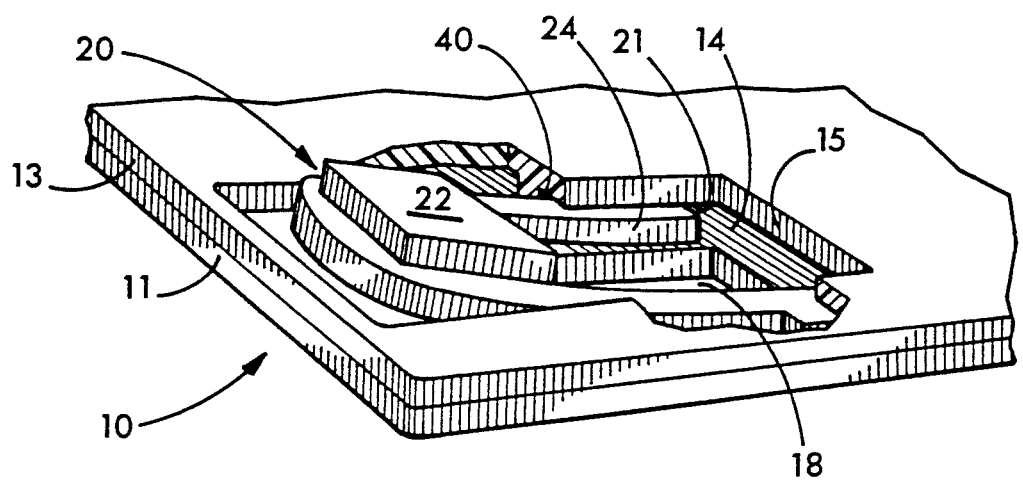
FIG. 8 is a partial perspective view of the computer floppy disk illustrating the insertion of the write-protect button of FIGS. 4-7.

Prior to installing the write-protect button 20 on a floppy disk 10, the legs 24 are bent inwardly as illustrated in FIG. 6 and placed in a channel 21 formed in the pocket 14 as illustrated in FIG. 8. The channel 21 is formed in the pocket 14 between the upper and lower jackets of the disk 10. The legs 24 are then slid along the sides 40 of the channel 21 until the blocking tab 22 is located entirely above the pocket 14. The button 20 is then snap-fit into the pocket 14 by pressing the blocking tab 22 against the pocket 14 of the floppy disk 10. At this point, the button 20 should be slidably contained in the pocket 14 of the floppy disk 10. The posts 28, 30 of the legs 24 "lock" the button 20 against the sides 40 of the channel 21. Once in place, the retrofitted button 20 has movement similar to a factory-installed button 12 as illustrated in FIGS. 1–3. The button 20 can be moved between the "read" position and the "read and write" position as illustrated previously in FIGS. 2 and 3.

Advantageously, the installable write-protect button 20 of the present invention allows the computer operator to utilize a disk which, for some reason, omitted the write-protect button.

Reference is now made to FIGS. 9–12 for an alternative embodiment of the write-protect button. As illustrated in these figures, there is a write-protect button 50, including a blocking tab 52 and generally parallel legs 54, characterized at their ends 55, 57 respectively by outwardly extending posts 56, 58. Whereas the prior embodiment, illustrated in FIGS. 4–7, was designed such that the legs 24 can bend inwardly in order to allow the button 20 to slide in the channel 21 of the disk 10, the embodiment illustrated in FIGS. 9–12 is provided with means to bend the button 50 along an axial alignment in order to insert the button in the channel 21. Thus, the button 50 is preferably made of a flexible material, such as rubber, soft plastic or other material which allows a certain resilience along with a semi-rigid memory flex. By this, it is meant that the button can be manipulated by inward pressures, such as pressures from a thumb and forefinger to change the original shape. When the inward pressures are removed, the button 50 will return to its original shape, as illustrated substantially in FIGS. 9 and 10.

To achieve this flexure, a flexure area 60 is provided in the button 50. The area 60 is characterized by cutaway portions 62, 64, as best illustrated in FIG. 10. This area 60 provides a flexure line illustrated in phantom at 66.

Referring now to FIGS. 11 and 12, the operation of button 50 will now be described. Inward pressures such as that applied by the thumb 68 and forefinger 70 are applied to the blocking tab 52 of the button 50 causing the button to flex along line 66, as illustrated in FIG. 11. The flexed button 50 is then inserted into the pocket 14 of the floppy disk 10. Once the insertion has been made, as illustrated in FIG. 11, the pressure is relaxed allowing the memory flexure to return the button 50 to its original shape in the pocket 14 as illustrated in FIG. 12.

The button 50 is then locked into place in the channel 21 by placement of the legs of the button along the sides 40 of the channel 21. The floppy disk 10 now has the capability of switching from a "read only" mode to a "write/read" mode.

The embodiments described in this application are considered illustrative only of the principles of the invention. It is understood that the invention is not confined to the particular construction and arrangement herein illustrated and described, but embraces such modified forms thereof as come within the scope of the following claims.

What is claimed is:

1. A write-protect button for retrofit installation in a write/read pocket in the jacket of a computer floppy disk, the pocket including a "read only" portion and a "write/read" portion and a channel within the jacket for slidably receiving the write-protect button, the write-protect button comprising:

a. a blocking tab of sufficient size to encompass the "read only" opening, the blocking tab having a first upper end, a second lower end and two sides wherein the blocking tab comprises a flexure area enabling the blocking tab to flex in axial alignment with the sides of the blocking tab such that the sides are urged toward each other under inward pressure of the sides of the blocking tab and return to its original position when the pressure is removed; and b. a pair of substantially parallel spaced apart opposed legs having first ends and second ends, wherein the first ends of each leg are attached to the sides of the blocking tab, the legs comprising means to slidably engage the write-protect button in the channel.

2. A method of installing a write-protect button a write/read pocket in the jacket of an intact computer floppy disk, the pocket including a "read only" portion and a "write/read" portion and a channel within the jacket for slidably receiving the write-protect button, which disk does not include a write-protect button, comprising:

a. positioning the write-protect button near the write/read pocket, the write-protect button comprising:
  i. a blocking tab of sufficient size to encompass the "read only" opening, the blocking tab having a first upper end, a second lower end and two sides wherein the blocking tab comprises a flexure area enabling the blocking tab to flex in axial alignment with the sides of the blocking tab such that the sides are urged toward each other under inward pressure of the sides of the blocking tab and return to its original position when the pressure is removed; and
  ii. a pair of substantially parallel spaced apart opposed legs having first ends and second ends, wherein the first ends of each leg are attached to the sides of the blocking tab, the legs comprising means to slidably engage the write-protect button in the channel;
b. flexing the blocking tab inwardly under inward pressure such that the second ends of the legs are drawn closer together to bend the blocking tab in axial alignment with the sides of the blocking tab urging the sides toward each other under inward pressure of the sides of the blocking tab;
c. inserting the second ends of the into the channel of the write/read pocket; and
d. urging the first ends of the into the opening of the write/read pocket, wherein the write-protect button slidably fits into the write/read pocket and is retained therein.

* * * * *